UNITED STATES PATENT OFFICE.

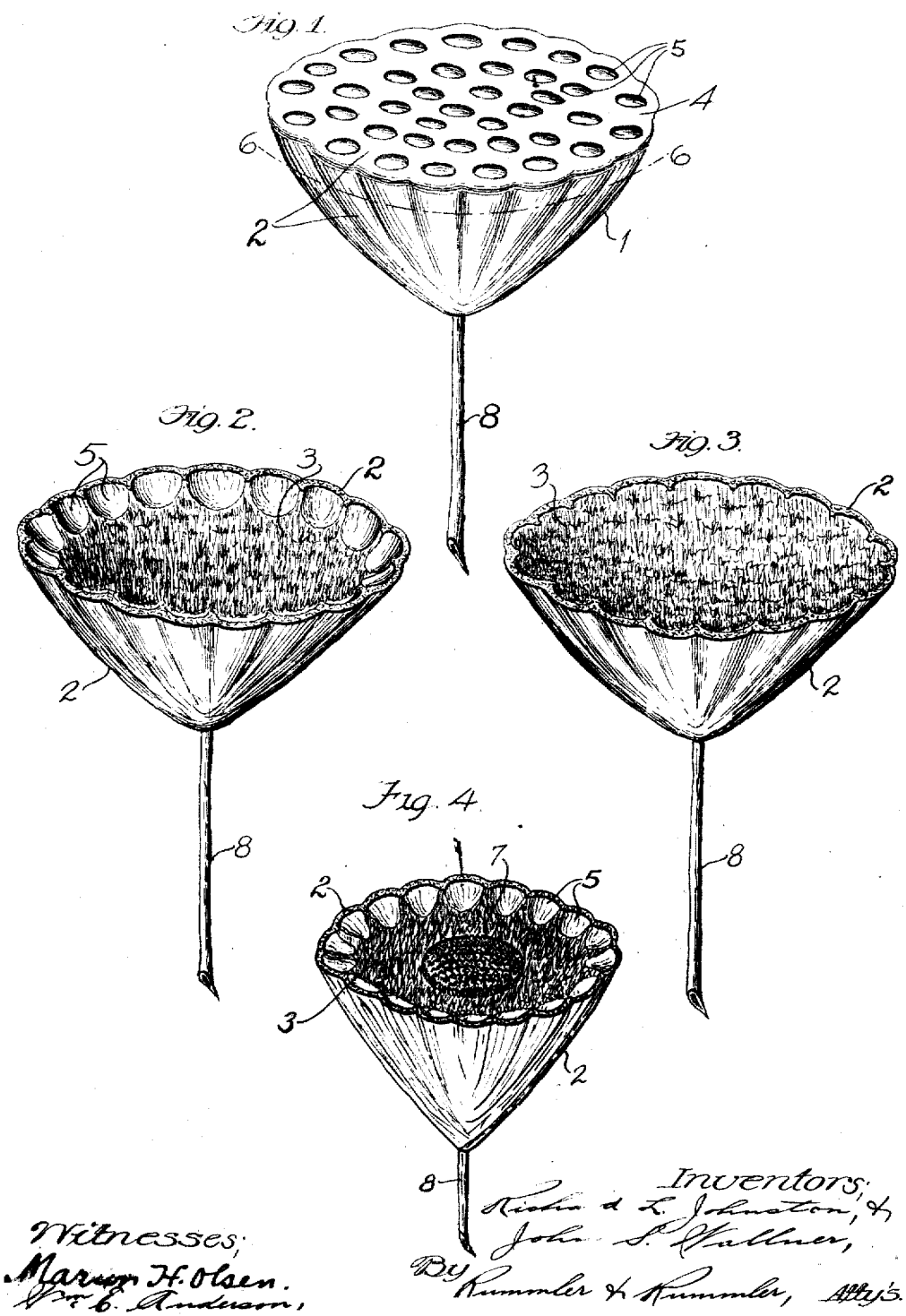

RICHARD LLOYD JOHNSTON AND JOHN S. WALLNER, OF CHICAGO, ILLINOIS, ASSIGNORS TO BERGMAN-KOROPP & CO., INC., OF CHICAGO, ILLINOIS, A CORPORATION OF ILLINOIS.

DECORATIVE PLANT PRODUCT.

1,405,786.

Specification of Letters Patent.   Patented Feb. 7, 1922.

Application filed May 26, 1921.   Serial No. 472,774.

*To all whom it may concern:*

Be it known that we, RICHARD LLOYD JOHNSTON and JOHN S. WALLNER, citizens of the United States of America, and residents of Chicago, county of Cook, and State of Illinois, have invented certain new and useful Improvements in Decorative Plant Products, of which the following is a specification.

This invention relates to the decorative arts, and especially to the manufacture of artificial flowers and the like.

The main objects of this invention are to provide a decorative plant product of natural growth formed by cutting and trimming certain parts away and preferably having decorative features added thereto adapting it for permanent display and ornamental purposes; and to provide an improved method of cutting and decorating a lotus seed pod (torus) or the like of natural growth so as to form an artistic plant product simulating a natural growth of different design and appearance from the lotus plant.

Illustrative embodiments of this invention are shown in the accompanying drawings, wherein—

Fig. 1 is a perspective view of a matured lotus seed pod, or it may be said to represent the "torus or receptacle" of the Nelumbium, found in the water-lily family.

Fig. 2 is a perspective view of one form of the improved plant product or artificial flower.

Fig. 3 is a perspective view of a modification, showing a lotus seed pod from which the top has been cut and all of the seed pockets have been removed, leaving little but the shell.

Fig. 4 is a perspective view of a modification similar to the form shown in Fig. 2, but having another plant part of flower set in the clipped pod or torus.

The plant growth which is most adapted, and therefore preferable for use in carrying out the present invention, is the Nelumbo of the water-lily family, commonly known as the American lotus.

The plant to be treated is gathered or harvested in any stage of its development after the formation of the torus pod or seed receptacle, but the best results are obtained with the plants which have been gathered after the seed pods have reached maturity.

In the specific embodiment here illustrated the lotus pod or torus 1, which normally includes the usual top-shaped outer shell or casing 2 and the interior body structure 3 consisting of sponge-like or woody fibers, is formed mainly by cutting off the top. The torus or receptacle normally has a perforated flat upper surface or top part 4, in which there are seed pockets 5 having substantially the same texture as the shell 2. The woody fiber 3 is normally concealed entirely from view.

In carrying out the present invention, the perforated top 4 is cut away as shown by the line 6—6 of Fig. 1, thereby cutting in half the seed pockets 5, especially the outer row. The remaining parts of the pockets then appear in the form of hemispherical cavities.

After the top of the receptacle is cut away, the hemispherical pockets in the inner part or especially the center of the pod are scraped out as with a knife or other suitable tool, so as to expose to view the fibrous part 3. In the specific embodiment shown in Fig. 2, the outer row of seed pockets adjacent to the rim of the pod are left in place to simulate petals. In the embodiment shown in Fig. 3, all of the pockets are scraped out so that the outer shell and woody fibers simulate a poppy. If desired, a small ornament or flower 7 such as a dandelion may be fastened in the center of the fibrous part for an additional decorative feature as illustrated in the embodiment shown in Fig. 4. Extending through a hole formed in the bottom of the pod is a willow stem 8 or the like.

After the plant has been cut to either of the forms shown in Figs. 2 or 3, it may, if desired, be treated with a preservative such as a solution of glycerine, water and formalin. The pod is coated with coloring mater, preferably a flat oil paint applied so as to give either a solid color appearance, or preferably a shaded appearance. A coating of adhesive, preferably in the form of highgrade spar varnish, is then applied by means of a spray brush to protect and give luster to the flat colors and also to retain the subsequently applied colors.

Brilliant effects may be produced by applying powdered pigment to the part 3 and pockets 5 while the varnish is still wet. Bronze dust, chips, granules, and crystals of various character may also be applied to give still more delicate effects.

The liquid coloring may, as a rule, be applied best by means of a spray brush, although the first coat of flat coloring may be applied by dipping the pod directly into a thin paint. In the latter case, the excess paint may be drained off by suspending the plant over a suitable drip pan, as will be understood. The dust pigments, chips, floss and the like may be dusted onto the woody fiber 3 and pockets 5 by means of a pepper shaker or in some instances by means of a pneumatic fan or blower.

There is great utility of this invention in the decorative art, especially for store window and general interior decorations, stage scenery, landscape and garden effects. The product is not only cheap and easy to produce, but is durable and capable of most rich and pleasing effects.

It will be understood that some of the details of the embodiments shown may be altered or omitted without departing from the spirit of this invention as defined by the following claims.

We claim:

1. An article of manufacture comprising a seed pod of natural growth having portions thereof cut away to produce a certain predetermined ornamental appearance, said pod being decorated artificially.

2. An article of manufacture comprising a seed pod of natural growth having portions thereof cut away to produce a certain predetermined ornamental appearance, said pod being impregnated with a preservative and decorated artificially to simulate a natural growth having a design destinct from the appearance of said pod in its natural form.

3. An article of manufacture comprising a seed pod of natural growth having an outer shell and a plurality of seed pockets arranged within said shell, the upper part of said shell being cut away to expose and show the inner faces of a plurality of said pockets and so produce a certain predetermined ornamental appearance, said pod being decorated artificially to simulate a natural growth having a design destinct from the outward appearance of said pod in its natural form.

4. An article of manufacture comprising a seed pod of natural growth having a plurality of seed pockets arranged within an outer shell, certain of said seed pockets and the upper part of said shell being cut away to expose to view the interior part of said pod, said pod being decorated artificially.

5. An article of manufacture comprising a lotus seed receptacle of natural growth having a plurality of seed pockets in its upper face, certain of said seed pockets and the upper part of said receptacle being cut away to expose to view the interior part of said receptacle, said seed receptacle being decorated artificially.

Signed at Chicago this 23 day of May, 1921.

RICHARD L. JOHNSTON.
JOHN S. WALLNER.